Sept. 26, 1961

W. B. ELLIOTT 3,001,423

METHOD OF FORMING A BLIND RECESS

Filed March 16, 1959

Inventor
WILLIAM B. ELLIOTT
by: *Harold S. Cox*
ATTORNEY

United States Patent Office 3,001,423
Patented Sept. 26, 1961

3,001,423
METHOD OF FORMING A BLIND RECESS
William B. Elliott, St. Catharines, Ontario, Canada
Filed Mar. 16, 1959, Ser. No. 799,628
17 Claims. (Cl. 77—67)

This invention relates to a method of forming a blind recess having an internal outwardly tapered portion and is a continuation-in-part of my copending application Serial No. 670,544 filed July 8, 1957, issued as Patent No. 2,899,224 on August 11, 1959.

In my copending application Serial No. 670,544, now Patent No. 2,899,224 there is disclosed and claimed a method for joining parts. This method involves the use of a recess in the female member having at least an intermediate parallel portion and an internal outwardly tapered enlargement thereof. According to the method of my earlier application, the male member is so designed that the interference between it and the parallel portion of the recess is such that the male member when inserted is stressed into the parallel portion of the recess substantially beyond its elastic limit, whereby upon insertion past the parallel portion and into the internal enlargement thereof, it expands in accordance with its properties of elasticity following such stress beyond the elastic limit into the internal enlargement, thereby forming a positive lock against withdrawal therefrom.

The copending application Serial No. 670,544, now Patent No. 2,899,224, discloses but does not claim a method whereby such an internal recess may be formed and this application is a continuation-in-part of that disclosure.

So far as I am aware the usual method of forming a blind hole with an internal enlarged recess is by the use of an expanding bit. These bits are expensive, and require frequent replacement making the cost of their use high.

In the practice of the invention described in my copending application and any other applications where a conventional press fit (i.e. one in which the male member is not stressed beyond its elastic limit) is employed, it is desirable to have an internal recess with tapered side walls and it is not generally necessary for the maximum (i.e. inside) diameter of this recess to be a great deal larger than the parallel portion of the recess. As long as there is a significant enlargement, the male member can expand thereinto and form a satisfactory and permanent lock.

It is the principal object of this invention, therefore, to provide a method of forming a blind recess having at least an intermediate parallel portion and an internal tapered enlargement thereof which may be effected economically and quickly and with only minor modifications to conventional tools.

This and other advantageous objects will become apparent through a consideration of the following detailed description taken in conjunction with the attached drawings in which.

Figure 5:
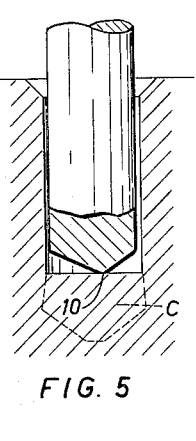
FIGURE 5 is a view similar to FIGURE 4 showing an alternate embodiment of this invention.
Figure 6:
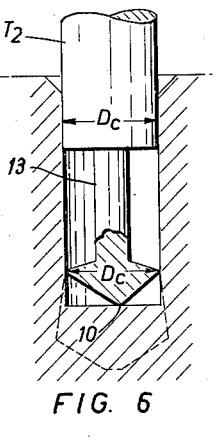
Figure 7:
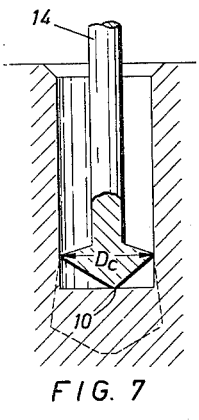
Figure 8:
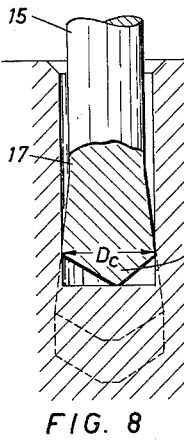

FIGURES 6 to 8 inclusive are views similar to FIGURE 5 showing three alternate embodiments of the invention.

Figure 9:
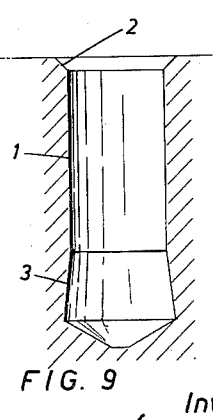

FIGURE 9 is a cross-sectional view of a recess formed according to the method of this invention.

The invention consists broadly in the method of forming a blind hole having at least an intermediate parallel portion and an internal enlargement thereof which comprises forming an initial blind hole by any conventional method such as drilling or casting and subsequently deepening said initial hole by applying thereto a cutting tool having an eccentric point and a maximum cutting width not greater than the width of the parallel portion required to and beyond the bottom of the initial hole whereby, in its preferred embodiment, the eccentricity of the tool causes the lower portion of the tool to bend, below the parallel portion, and to form a tapered enlargement beneath said parallel portion in the manner hereinafter described in detail.

In greater detail and referring now to the drawings, it is the object of the invention to provide a blind hole such as that illustrated in FIGURE 9 having at least an intermediate parallel portion 1, preferably having an initial outwardly flared portion 2 and having an internal tapered enlargement of the parallel portion 3 into which a male member inserted past the parallel portion 1 may expand to provide a positive lock.

Figure 1:
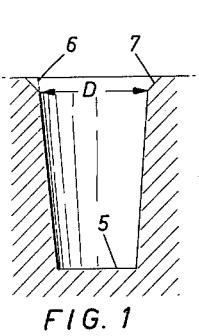
FIGURES 1 and 2 are cross-sectional views illustrating alternative preliminary steps in the practice of the method which forms the subject of this invention.
Figure 2:
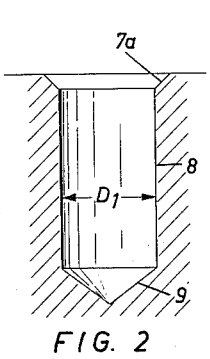

The method of the invention requires the preliminary formation of an initial blind hole such as that illustrated in either FIGURE 1 or FIGURE 2, by conventional means. If the initial blind hole is cast or similarly formed, as is the case in FIGURE 1, it will have inwardly tapered side walls 4 and a substantially flat bottom 5 the diameter of which will be substantially less than the outside diameter. For reasons explained in my copending application this initial hole will preferably be provided with an external flared portion 7 to facilitate insertion of the male member and to act as a die to compress the male member into the parallel or minimum diameter portion of the recess. If the initial recess is formed by drilling as is the case in FIGURE 2, it will have parallel side walls 8 a pointed bottom 9 corresponding to the configuration of the drill used and for reasons already explained will preferably have an initial flared portion 7a.

If the initial blind hole is formed as in FIGURE 1 by casting or some other method providing inwardly tapered side walls 4, the maximum diameter below the flared portion (i.e. diameter D) will be greater than the diameter at 5 and will be such that the diameter of the parallel portion ultimately required will be greater than the diameter at 5 and preferably substantially equal to or slightly greater than diameter D.

If the initial blind hole is formed as in FIGURE 2 by drilling, the diameter of the drilled portion $D_1$ must be not greater than the diameter of the parallel portion ultimately required and may be slightly less than this diameter for reasons which will become apparent hereafter.

According to the method of this invention the initial blind hole whether formed in accordance with the methods of FIGURE 1 or 2 is deepened by applying thereto a cutting tool, preferably a drill, having a maximum cutting width or diameter not greater than the diameter of the parallel portion required and, in the preferred embodiment, equal to the diameter of the parallel portion ultimately required, together with an eccentric point.

Figure 3:
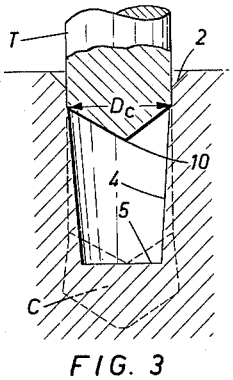
FIGURE 3 is a cross-sectional schematic view showing the practice of the invention as applied to the embodiment of FIGURE 1.

FIGURE 3 shows the application of the method to the initial hole of FIGURE 1. In this case, the initial blind hole is illustrated as at 4 and a drill T is applied to this hole, the drill T having an eccentric point 10 and a cutting diameter $D_c$ equal to the diameter of the parallel portion desired. As shown specifically in FIGURE 3, $D_c$ is slightly less than $D_0$ in FIGURE 1 and is significantly larger than the diameter 5. As this tool is applied to the initial blind hole, it will cut a parallel hole of diameter $D_c$ until the point 10 reaches the bottom 5 of the initial blind hole. Further application of the drill below this point, because of the eccentricity of the point 10, will cause the point of the tool to bend. This bending will be resisted by the parallel portion cut above point 5 and the bending of the drill point below this point will form an outwardly tapered internal recess C having tapered side walls 11 the taper of which will depend upon the eccentricity of the point 10.

Figure 4:
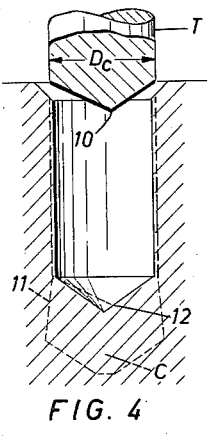
FIGURE 4 is a cross-sectional schematic view similar to FIGURE 3 showing the practice of the invention as applied to the embodiment of FIGURE 2.

FIGURE 4 illustrates the application of the method of the invention to the blind hole formed by drilling as shown in FIGURE 2. In this case, a tool $T_1$ is applied, this tool being slightly greater in diameter than the diameter $D_1$ of the initial hole and being equal in diameter to the diameter of the parallel portion required. The application of this drill will enlarge the initial hole from diameter $D_1$ to diameter $D_c$ forming a parallel hole of diameter $D_c$ until the eccentric point 10 penetrates beyond the lower limit of the initial blind hole i.e. at 12. Further penetration of the tool beyond this point will cause the point of the tool to bend and to form a tapered recess C having outwardly tapered side walls 11 again depending upon the eccentricity of the point 10 of the drill $T_1$.

It will be appreciated that in the case of a blind hole formed initially by drilling, the initial blind hole could be of a diameter $D_1$ equal to the diameter of the parallel portion of the hole ultimately required and the tool $T_1$ could have a diameter $D_c$ either equal to this diameter in which case the tool would have no effect until it penetrates beyond the bottom of the initial hole.

The latter case is illustrated in FIGURE 5 which illustrates the relationship of the parts where the initial hole is formed with parallel side walls of a diameter equal to the diameter of the parallel portion ultimately required and the tool applied has an eccentric point but possesses a cutting diameter less than the diameter of this parallel part. In this case the tool will have no effect until it reaches the bottom of the initial hole whereupon it will cut a recess C as shown depending upon the eccentricity of the point 10; the parallel portion of the original hole even though greater than the diameter of the tool being sufficient to confine the tool therein and to permit the point to bend to form the taper required at C.

FIGURES 6 to 8 inclusive illustrate other tools which would facilitate the practice of the invention but which basically embody the inventive concept inherent in the method already described.

In FIGURE 6, the cutting tool $T_2$ has a maximum cutting diameter $D_c$ not greater than and preferably equal to the diameter of the parallel portion required, and a cutting head having a maximum diameter substantially equal to $D_c$ and the eccentric point 10 already described. In this case, however, a neck 13 is provided between the shank of the tool and the head, this neck being of reduced cross-section whereby the amount of bending of the point of the tool, following penetration past the original blind recess may be increased and controlled and thus the taper of the internal recess correspondingly controlled.

FIGURE 7 illustrates a further possible embodiment of the invention. In this case the shank of the tool is of greatly reduced cross-section beyond that of the head. In this case, the bending of the tool point is limited by the rigidity of the shank 14 in the prime mover (e.g. drill press).

A further alternative embodiment is illustrated in FIGURE 8. In this case, the shank 15 is of lesser dimensions than the maximum diameter $D_c$ of the head 16 and the shank 17 is tapered from diameter $D_c$. In this case, the eccentric point exerts an outward force as the tool progresses beyond the bottom of the initial hole, the tapered portion A bearing in the newly formed tapered portion of the hole B restricting the outward progress of the tool to coincide with the portion A until the top of the tool C bears on the sides of the initial hole where, upon further progression, an enlargement D with parallel sides is formed if the tool is rigid, or with tapering sides if the tool bends.

The following specific example of the dimensions involved in the practice of the invention may assist in a better understanding of the precise nature of the invention. An initial hole was drilled .787 inch deep using a $^{47}/_{64}$ drill (i.e. .734 inch) thus providing an initial hole .734 inch in diameter. The hole was then deepened by applying a drill again $^{47}/_{64}$ but with a point eccentric by .030 inch. The depth of the hole was deepened from .787 inch to a total of 1.250 inches. This drill cut an enlarging taper on the bottom of the original hole the maximum (bottom) diameter of which was .780 inch. Thus it may be seen that the practice of the invention in this particular application provided an internal recess having .046 inch enlargement in diameter. This enlargement is sufficient to provide the type of seal required by the method of my copending application.

The invention has been described for the purposes of convenience as relating to a circular recess formed by the application of drill bits. It is to be understood that the invention is not limited to a circular recess nor to drills and a tapered hole could be formed by a section other than round through the application of a tool other than by rotation and pressure as for example by impact.

While preferred embodiments of the invention have been described in detail, it is to be understood that the invention is not limited to such preferred embodiments or to constructional details. Such embodiments of the invention as come within the scope and purview of the invention are to be considered as part of this invention.

What I claim as my invention is:

1. The method of forming a blind recess with at least an intermediate parallel portion and an internal continuously tapered enlargement thereof which comprises forming an initial blind hole by conventional means, said initial blind hole having an intermediate portion not wider than the width of the intermediate parallel portion required, subsequently deepening said initial hole by introducing a tool having an eccentric cutting point into said initial blind hole to the extent necessary to engage said eccentric cutting point with the bottom of said initial blind hole, advancing said eccentric cutting point beyond the bottom of said initial blind hole, and bending the lower portion of said tool carrying said cutting point always away from the axis of said initial blind hole, while maintaining the shank of said tool at least substantially unmovable transversely to form said continuously tapered enlargement.

2. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, subsequently deepening said initial blind hole by introducing a drill bit having an eccentric cutting point and a diameter not greater than the diameter of the intermediate parallel portion desired into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

3. The method of forming a circular blind recess with at least an intermediate parallel portion and an internal continuously tapered enlargement thereof which comprises forming an initial inwardly tapered hole by conventional means, said initial hole having an inside diameter less than the diameter of the parallel portion desired, subsequently enlarging and deepening said hole by introducing a drill bit having an eccentric cutting point and a diameter equal to the diameter of the parallel portion required into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

4. The method of forming a circular blind recess with at least an intermediate parallel portion and an internal continuously tapered enlargement thereof which comprises forming an initial blind hole by conventional means, said initial hole having parallel side walls not greater in diameter than the diameter of the parallel portion required, subsequently enlarging and deepening said hole by introducing a drill bit having an eccentric cutting point and a diameter not greater than the diameter of the parallel portion desired into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

5. The method of forming a circular blind recess with at least an intermediate parallel portion and an internal continuously tapered enlargement thereof which comprises forming an initial blind hole by conventional means, said initial hole having parallel side walls not greater in diameter than the diameter of the parallel portion required, subsequently enlarging and deepening said hole by introducing a drill bit having an eccentric cutting point and a diameter equal to the diameter of the parallel portion desired into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

6. The method of forming a circular blind recess having at least an intermediate parallel portion and an internal continuously tapered enlargement thereof which comprises forming an initial blind hole by conventional means, said initial blind hole having parallel side walls substantially equal in diameter to the diameter of the parallel portion required, subsequently deepening said initial hole by introducing a drill bit having an eccentric cutting point and a diameter equal to the diameter of the parallel portion required into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

7. The method of forming a circular blind recess having at least an intermediate parallel portion and an internal continuously tapered enlargement thereof which comprises forming an initial blind hole by conventional means, said initial blind hole having parallel side walls equal in diameter to the diameter of the parallel portion required, subsequently deepening said initial hole by introducing a drill bit having an eccentric cutting point and a diameter not greater than the diameter of the parallel portion required into said initial blind hole of the extent necessary to engage said eccentric cutting point with the bottom of said initial blind hole, the eccentricity of said cutting point being greater than one-half of the difference between the diameter of said parallel portion and the diameter of said drill bit, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

8. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, subsequently deepening said initial hole by introducing a drill bit having an eccentric cutting point, a shank with a maximum diameter not greater than the diameter of said parallel portion required, a cutting head having a maximum diameter not greater than the diameter of said parallel portion required and an intermediate neck of substantially reduced cross-section into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

9. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, subsequently deepening said initial hole by introducing a drill bit having an eccentric cutting point, a shank with a maximum diameter equal to the diameter of said parallel portion desired, a cutting head having a maximum diameter not greater than the diameter of said parallel portion required, and an intermediate neck of substantially reduced cross-section into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

10. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, subsequently deepening said initial hole by introducing a drill bit having an eccentric cutting point, a maximum diameter equal to the diameter of said parallel portion desired, a cutting head having a maximum diameter equal to the diameter of said parallel portion required and an intermediate neck of substantially reduced cross-section into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining the shank of said drill bit at least substantially unmovable transversely to form said continuously tapered enlargement.

11. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, and subsequently deepening said initial hole by introducing a drill bit having an eccentric cutting point carried on a cutting head having a maximum diameter not greater than the diameter of said parallel portion required and a shank of substantially reduced cross-section into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining said shank of said drill bit remote from said cutting head at least substantially unmovable transversely to form said continuously tapered enlargement.

12. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, subsequently deepening said initial hole by introducing a drill bit having an eccentric cutting point carried on a cutting head having a maximum diameter equal to the diameter of said parallel portion required and a shank of substantially reduced cross-section into said initial blind hole to the extent necessary to engage said eccentric cutting point with the bottom of said initial blind hole, advancing said eccentric cutting point beyond said bottom of said initial blind hole, and bending the lower portion of said drill bit carrying said eccentric cutting point always away from the axis of said initial blind hole, while maintaining said shank of said drill bit remote from said cutting head at least substantially unmovable transversely to form said continuously tapered enlargement.

13. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, subsequently deepening said initial hole by introducing a drill bit having an eccentric cutting point carried on a cutting head having a maximum diameter not greater than the diameter of said parallel portion required and a shank of substantially reduced cross-section into said initial blind hole to the extent necessary to engage said eccentric cutting point with the bottom of said initial blind hole, said drill bit being tapered from the minimum diameter of said shank to the maximum diameter of said cutting head, advancing said eccentric cutting point beyond said bottom of said initial blind hole, and bending the lower portion of said drill bit carrying said eccentric cutting point always away from the axis of said initial blind hole, while maintaining said shank of said drill bit remote from said cutting head at least substantially unmovable transversely to form said continuously tapered enlargement.

14. The method of forming a circular blind recess with at least an intermediate parallel portion and an internal continuously tapered enlargement thereof which comprises forming an initial blind hole by conventional means, said initial blind hole having an intermediate portion not greater in diameter than the diameter of the intermediate parallel portion required, subsequently deepening said initial hole by introducing a drill bit having an eccentric cutting point carried on a cutting head having a maximum diameter equal to the diameter of the parallel portion required and a shank of substantially reduced cross-section into said initial blind hole to the extent necessary to engage said eccentric cutting point with the bottom of said initial blind hole, said drill bit being tapered from the minimum diameter of said shank to the maximum diameter of said cutting head, advancing said eccentric cutting point beyond said bottom of said initial blind hole, and bending the lower portion of said drill bit carrying said eccentric cutting point always away from the axis of said initial blind hole, while maintaining said shank of said drill bit remote from said cutting head at least substantially unmovable transversely to form said continuously tapered enlargement.

15. The method of deepening an initial blind hole by employing a tool having an eccentric cutting point to form an internal continuously tapering enlargement of said blind hole which comprises the steps of introducing said tool into said blind hole to the extent necessary to engage said eccentric cutting point with the bottom of said blind hole, advancing said eccentric cutting point beyond said bottom of said blind hole, and bending the lower portion of said tool carrying said eccentric cutting point always away from the axis of said blind hole, while maintaining the shank of said tool at least substantially unmovable transversely to form said continuously tapering enlargement.

16. The method according to claim 15 wherein said tool is a drill having a maximum diameter at least as great as the diameter of said blind hole.

17. The method of deepening and enlarging an initial blind hole by employing a drill having an eccentric cutting point and a maximum diameter greater than the diameter of said blind hole to enlarge said blind hole and form an internal continuously tapering enlargement thereof which comprises the steps of introducing said tool into said blind hole to the extent necessary to engage said eccentric cutting point with the bottom of said blind hole, advancing said eccentric cutting point beyond said bottom of said blind hole, and bending the lower portion of said tool carrying said eccentric cutting point always away from the axis of said blind hole, while maintaining the shank of said tool at least substantially unmovable transversely to form said continuously tapering enlargement.

References Cited in the file of this patent

UNITED STATES PATENTS

| 412,508 | James | Oct. 8, 1889 |
| 547,880 | Fowler et al. | Oct. 15, 1895 |
| 864,756 | Phillips | Aug. 27, 1907 |

FOREIGN PATENTS

| 657 | Great Britain | 1896 |
| 910,376 | Germany | May 3, 1954 |